(12) United States Patent
Zaykov et al.

(10) Patent No.: US 12,204,952 B2
(45) Date of Patent: Jan. 21, 2025

(54) SYSTEMS AND METHOD FOR THERMAL MANAGEMENT OF COMPUTING SYSTEMS

(71) Applicant: Honeywell International s.r.o., Prague 4-Chodov (CZ)

(72) Inventors: Pavel Zaykov, Brno (CZ); Peter Mathia, Dunajska Luzna (SK)

(73) Assignee: Honeywell International s.r.o., Prague 4-Chodov (CZ)

( * ) Notice: Subject to any disclaimer, the term of this patent is extended or adjusted under 35 U.S.C. 154(b) by 476 days.

(21) Appl. No.: 17/703,721

(22) Filed: Mar. 24, 2022

(65) Prior Publication Data
US 2023/0305906 A1    Sep. 28, 2023

(51) Int. Cl.
*G06F 9/50* (2006.01)
*G06F 9/48* (2006.01)
*G06F 1/20* (2006.01)

(52) U.S. Cl.
CPC .......... *G06F 9/5094* (2013.01); *G06F 9/4893* (2013.01); *G06F 9/5016* (2013.01); *G06F 1/206* (2013.01)

(58) Field of Classification Search
None
See application file for complete search history.

(56) References Cited

U.S. PATENT DOCUMENTS

| | | | |
|---|---|---|---|
| 7,064,994 B1 | 6/2006 | Wu | |
| 8,621,473 B2 | 12/2013 | Miller et al. | |
| 8,806,579 B1 | 8/2014 | Angus et al. | |
| 11,184,236 B2 | 11/2021 | Bernat et al. | |
| 2004/0019738 A1 | 1/2004 | Kahn et al. | |
| 2008/0163226 A1 | 7/2008 | Radhakrisnan et al. | |
| 2009/0265568 A1* | 10/2009 | Jackson | G06F 1/3203 713/320 |
| 2010/0199280 A1 | 8/2010 | Vestal et al. | |
| 2012/0144394 A1* | 6/2012 | Prabhakar | G06F 9/4893 718/102 |
| 2012/0185848 A1 | 7/2012 | Devarakonda et al. | |
| 2013/0031543 A1 | 1/2013 | Angus | |

(Continued)

FOREIGN PATENT DOCUMENTS

WO    WO-2012082349 A2 *    6/2012    ............. G06F 1/329

OTHER PUBLICATIONS

Aguilera et al., "QoS-Aware Dynamic Resource Allocation for Spatial-Multitasking GPUs", 2014 19th Asia and South Pacific Design Automation Conference, Jan. 20-23, 2014, Singapore, Jan. 20, 2014, pp. 726 through 731, Publisher: IEEE.

(Continued)

*Primary Examiner* — Charles E Anya
(74) *Attorney, Agent, or Firm* — Fogg & Powers LLC

(57) ABSTRACT

Systems and methods for thermal management of computing systems are provided. The systems and methods described herein guarantee a thermal envelope of a computing system while preserving the compute and render performance capabilities of the computing system by implementing a thermal-aware scheduling policy, adjusting an amount of available memory bandwidth to computing resources, adjusting an amount of memory utilization by one or more applications executed by the computing resources, and/or allocating cache to workloads based on memory demands.

20 Claims, 6 Drawing Sheets

(56) References Cited

U.S. PATENT DOCUMENTS

| | | | |
|---|---|---|---|
| 2015/0026695 A1* | 1/2015 | Dawson | G06F 1/3228 718/103 |
| 2015/0233605 A1* | 8/2015 | Bernhardt | F24H 9/20 236/1 F |
| 2019/0294472 A1 | 9/2019 | Varadarajan et al. | |
| 2020/0371699 A1* | 11/2020 | Paulraj | G06F 3/0673 |
| 2021/0263773 A1* | 8/2021 | Shah | G06F 9/4893 |
| 2022/0138131 A1 | 5/2022 | Zaykov et al. | |
| 2022/0171549 A1* | 6/2022 | Saeed | G06F 3/0604 |

OTHER PUBLICATIONS

Hanson et al., "What Computer Architects Need to Know About Memory Throttling", WEED 2010—Workshop on Energy-Efficient Design, Jun. 2010, Jun. 17, 2010, Saint Malo, France, inria-00492851, pp. 43 through 49, Publisher: HAL.

Kim et al., "Power Guarantee for Electric Systems Using Real-Time Scheduling", IEEE Transactions on Parallel and Distributed Systems, vol. 31, No. 8, Aug. 2020, Published Feb. 28, 2020, pp. 1783 through 1798, Publisher: IEEE.

Molka et al., "Characterizing the Energy Consumption of Data Transfers and Arithmetic Operations on x86-64 Processors", Author's version, Proceedings of the 1st International Green Computing Conference, Aug. 15-18, 2010, Chicago, IL, (ICCC'10), pp. 1 through 11, as downloaded Mar. 23, 22 from: https://tu-dresden.de/zih/forschung/ressourcen/dateien/abgeschlossene-projekte/benchit/2010_IGCC_authors_version.pdf?lang=en.

Wang et al., "Balancing Energy Efficiency and Real-Time Performance in GPU Scheduling", 2021 IEEE Real-Time Systems Symposium (RTSS), Dec. 7-10, 2021, Dortmund, Germany, Dec. 7, 2021, pp. 1 through 13, as downloaded Jan. 16, 2022 from: https://intra.ece.ucr.edu/~hyoseung/pdf/rtss2021_sBEET.pdf.

European Patent Office, "Extended European Search Report", from U.S. Appl. No. 17/703,721, filed Jul. 7, 2023, from Foreign Counterpart to U.S. Appl. No. 17/703,721, filed Jul. 7, 2023, pp. 1 through 9, Published: EP.

European Patent Office, "Communication pursuant to Article 94(3)EPC", dated Aug. 26, 2024, from EP Application No. 23150440.8, from Foreign Counterpart to U.S. Appl. No. 17/703,721, pp. 1 through 9, Published: EP.

* cited by examiner

SYSTEMS AND METHOD FOR THERMAL MANAGEMENT OF COMPUTING SYSTEMS

STATEMENT REGARDING NON-US SPONSORED RESEARCH OR DEVELOPMENT

The project leading to this application has received funding from the Clean Sky 2 Joint Undertaking (JU) under grant agreement No 945535. The JU receives support from the European Union's Horizon 2020 research and innovation programme and the Clean Sky 2 JU members other than the Union. The project leading to this application has received funding from the SESAR Joint Undertaking (JU) under grant agreement No 101017643. The JU receives support from the European Union's Horizon 2020 research and innovation programme and the SESAR JU members other than the Union.

BACKGROUND

New safety-critical computing systems for aerospace are expected to host artificial intelligence (AI) or machine learning (ML) applications. One of the most computationally intensive parts of an AI or ML application is the deep neural network (DNN) that is typically accelerated on a specialized inference engine (for example, a graphics processing unit (GPU). DNN inference operations involve a high number of matrix operations where the computing units of a GPU are heavily utilized for computation and involve high memory throughput to load/store the input data (for example, images or video) and the DNN weights. Further, modern graphics applications on aircraft perform decoding, encoding, mixing, and rendering of high-resolution video streams, which also requires a lot of computing and memory throughput.

When the safety-critical computing systems are implemented on an aircraft, the equipment needs to comply with standards that, among other things, require electronics to be maintained within a certain thermal envelope to prevent failures. These requirements vary depending on the type of aircraft (commercial, military, space, etc.) and the environmental conditions that the electronics will be exposed to for particular missions. The thermal envelope is a product of multiple parameters among which are the ambient temperature, the airflow parameters (for example, air volume per second), and the energy consumption (power consumption over time) of the electronics (for example, processor(s), memory, interfaces, etc.). The types of applications discussed above are most likely to consume large amounts of power and lead to stretching the thermal envelope and profile of the safety-critical computing systems.

One approach used to reduce the thermal profile of computing systems includes permanently setting the CPU/GPU operational voltage and frequency to a fraction of the maximum such that the CPU/GPU is not capable of exceeding its thermal profile. While this approach is straightforward, it substantially impacts the compute and render performance capabilities of the CPU/GPU due to the settings being very conservative to account for a worst-case scenario.

Another approach used to reduce the thermal profile of computing systems includes dynamically scaling the voltage and frequency of the CPU/GPU depending on the requirements of the system. For most of the time, the CPU/GPU runs at lower voltage and frequency to reduce power consumption, but the operational clock and voltage are increased for processing when needed and then scaled down again upon completion to preserve the thermal envelope. While this approach is less detrimental to the compute and render performance capabilities of the CPU/GPU, there are several disadvantages to this approach. For example, many components will not have this capability or have very limited amounts of supported operational frequencies and voltages. This approach is also not preferred for safety-critical applications because the transition period (downtime) required for switching the voltage and frequency is too high (for example, 100s of clock cycles) and it can be difficult to prove consistent operation of the components when these transitions are included.

For the reasons above, and for additional reasons discussed herein, there is a need for improved systems and methods that can guarantee a thermal envelope of computing systems in a wide range of environmental conditions.

SUMMARY

In an example, a computing system comprises computing resources and memory, wherein the computing resources are configured to perform computation and/or graphical processing. The computing system is configured to guarantee a thermal envelope of the computing system based on one or more operational parameters by: implementing a thermal-aware scheduling policy that utilizes an amount of computing resources and timing windows of the computing system based on the one or more operational parameters; adjusting an amount of available memory bandwidth to the computing resources of the computing system based on the one or more operational parameters; adjusting an amount of memory utilization of one or more applications executed by the computing resources of the computing system based on the one or more operational parameters; and/or allocating cache to workloads based on memory demands of the workloads, wherein more cache is allocated to workloads with high memory demands compared to workloads with low memory demands. The computing system is configured to schedule workloads for the computing resources based on the thermal-aware scheduling policy, the available memory bandwidth, the amount of memory utilization, and/or the cache allocation.

DRAWINGS

Understanding that the drawings depict only some embodiments and are not therefore to be considered limiting in scope, the exemplary embodiments will be described with additional specificity and detail using the accompanying drawings, in which.

Figure 1:
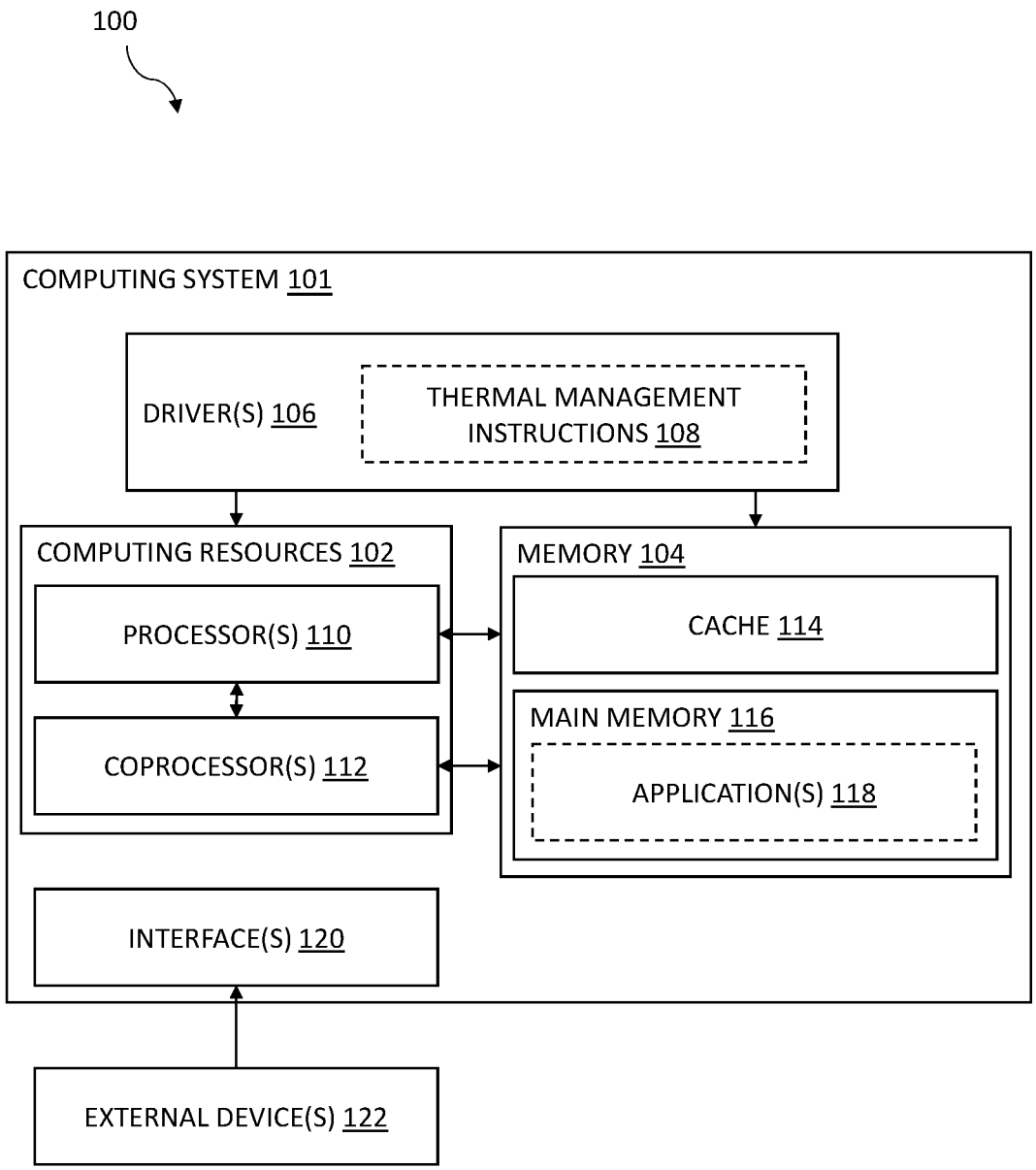
FIG. 1 is a block diagram of an example computing system.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The example systems and methods described herein guarantee a thermal envelope of a computing system while preserving the compute and render performance capabilities of the computing system. The example systems and methods include implementing a thermal-aware scheduling policy, adjusting an amount of available memory bandwidth to computing resources and/or adjusting an amount of memory utilization by one or more applications executed by the computing resources (memory throttling), and/or allocating cache to workloads based on memory demands (cache allocation). By using one or more of these techniques, the computing system can operate closer to its maximum performance given the environmental conditions while providing consistent operation sufficient for safety-critical applications.

FIG. 1 illustrates a block diagram of an example system 100 that includes a computing system 101. In the example shown in FIG. 1, the computing system 101 includes one or more computing resources 102, at least one memory 104, and one or more drivers 106. The computing system 101 is configured to perform computation and/or graphical processing. In some examples, the system 100 that includes the computing system 101 is a vehicle (for example, an aircraft, sea craft, spacecraft, automobile, or other types of vehicles). It should be understood that the computing system 101 could be implemented in other types of systems as well.

In some examples, the computing system 101 is a safety-critical computing system. A safety-critical computing system has two types of workloads for the coprocessor 112— high-priority workloads and low-priority workloads. For high-priority workloads, the computing system 101 shall deliver a timing guarantee for performance of the workload, whereas low-priority workloads are best-effort and executed whenever the computing resources 102 and memory 104 in the computing system 101 are available. For safety-critical computing systems, the thermal envelope requirements for the computing system cannot be violated. In the aerospace domain, a high-priority workload is associated with a high Design Assurance Level (DAL) (for example, DAL A-C) and a low-priority workload is associated with low DAL (for example, DAL D-E).

In the example shown in FIG. 1, the computing resources 102 of the computing system 101 include one or more processors 110. In some examples, the one or more processors 110 include one or more central processing units (CPUs). The one or more CPUs could be single-core CPUs or multi-core CPUs depending on design and processing requirements.

In the example shown in FIG. 1, the computing resources 102 of the computing system 101 also include one or more coprocessors 112. The one or more coprocessors 112 can be used, for example, for graphical processing or as hardware accelerators to provide additional computational resources to the one or more processors 110. In some examples, the one or more coprocessors 112 include one or more graphics processing units (GPUs). In some examples, at least one of the processors 110 is communicatively coupled to at least one of the coprocessors 112. When the coprocessors 112 are configured to perform the graphical processing functions of the computing system 101, the coprocessors 112 can perform decoding, encoding, mixing, and/or rendering of high-resolution video streams or other data. When the coprocessors 112 are used as hardware accelerators, the coprocessors 112 can be configured to perform matrix operations or the like.

In other examples, the computing resources 102 can be implemented using different combinations of components than those discussed above. For example, the computing resources 102 can include one or more single/multi-core digital signal processors, one or more specialized custom processing units (vision processing unit, application-specific integrated circuit, specialized co-processors), and/or one or more field-programmable gate arrays. The different components can be included in addition to, or instead of, the processors 110 and/or coprocessors 112 discussed above.

The computing resources 102 of the computing system 101 can be implemented as discrete or integrated components. In some examples, each of the processors 110 and coprocessors 112 are implemented as discrete components. In some such examples, each of the processors 110 and coprocessors 112 can be implemented using separate cards (for example, the processor can be implemented using a CPU card and the coprocessor can be implemented using a GPU card) or separate boxes. In other examples, at least some of the processors 110 and/or coprocessors 112 are integrated onto a single chip, a single card, or in a single box. It should be understood that the computing resources 102 can be implemented in other ways as well.

In the example shown in FIG. 1, the computing resources 102 of the computing system 101 share memory resources (for example, cache 114 and main memory 116). Typically, the computing resources 102 are configured to directly write/read data to/from the memory 104. In the example shown in FIG. 1, each of the computing resources 102 is communicatively coupled to the memory 104 and configured to read/write data to/from the memory 104. In some examples, at least some of the computing resources 102 are communicatively coupled to at least one cache 114 (for example, level 1 (L1) cache). The cache 114 contains memory and computing logic, and the cache 114 is coupled to main memory 116. In some examples, the main memory 116 can also be coupled to secondary storage (not shown). The cache 114 in the computing system is generally a smaller, faster memory than main memory 116. In some examples, the main memory 116 includes data and/or instructions for executing one or more applications 118 on the computing resources 102. In the examples described herein, the amount of cache 114 and main memory 116 is fixed for the computing system 101.

It should be understood, however, that the configuration shown in FIG. 1 and other arrangements and processes described herein are set forth for purposes of example only, and other arrangements and elements (e.g., machines, interfaces, functions, orders of elements, etc.) can be added or used instead. Further, as in most computer architectures, those skilled in the art will appreciate that many of the elements described herein are functional entities that may be implemented as discrete components or in conjunction with other components, in any suitable combination and location. For example, the computing system 101 may consist of multiple independent busses so that each computing resource 102 can access the memory 104 and other components without contending for a bus with the other computing resources 102. Furthermore, the computing system 101 may include more than one memory 104, which may be either within a chip or part of another chip in the computing system 101. Even further, a system may contain multiple independent main memories and secondary storages, not shown in FIG. 1. Each unit of memory 104 in the computing system 101 may comprise semiconductor memory, magnetic memory, optical memory, acoustic memory, biological memory, or any combination of these memory technologies, or any other memory technology used in conjunction with computational devices.

In the example shown in FIG. 1, the computing system 101 further includes one or more drivers 106 that are communicatively coupled to the computing resources 102 and the memory 104. In the example shown in FIG. 1, the one or more drivers 106 are separate components from the computing resources 102 and the memory 104. In other examples, each driver 106 can be integrated into a respective computing resource 102 and manage operation of that particular computing resource 102. For example, each processor and coprocessor in the computing resources 102 can include a respective driver 106 configured to control operation of the respective processor 110 or coprocessor 112.

In the example shown in FIG. 1, the one or more drivers of the computing system 101 are configured to control operation of the computing resources 102 in order to guarantee the thermal envelope of the computing system 101. In some examples, the one or more drivers (for example, one or more software modules on the one or more drivers) are configured to execute thermal management instructions 108 to control operation of the computing resources 102 in order to guarantee the thermal envelope of the computing system 101. In other examples, one or more additional or alternative components of the computing system 101 are configured to control operation of the computing resources 102 in order to guarantee the thermal envelope of the computing system 101. For example, at least some of the thermal management instructions 108 could be implemented using a kernel or workload for one or more of the computing resources 102. In some examples, the thermal management instructions 108 implement a thermal-aware scheduling policy, adjust an amount of available memory bandwidth to computing resources 102 and/or adjust an amount of memory utilization by one or more applications 118 executed by the computing resources 102 (memory throttling), and/or allocate cache 114 to workloads based on memory demands (cache allocation).

The thermal-aware scheduling policy underutilizes the computing resources 102 for computation and/or rendering to comply with the thermal envelope requirements. In some examples, the thermal-aware scheduling policy restricts the number of computing resources 102 available for workloads over periods of time. For example, the thermal-aware scheduling policy may reduce the number of computing resources 102 available for workloads such that the thermal profile of the computing system 101 stays within the thermal envelope. In some examples, the thermal-aware scheduling policy limits what applications can run during particular periods of time (for example, timing windows). For example, the thermal-aware scheduling policy may restrict the computing system 101 to execute only safety-critical applications (and possibly some best-effort applications) such that the thermal profile of the computing system 101 stays within the thermal envelope. In some examples, the thermal-aware scheduling policy intentionally keeps computing resources 102 idle during particular time periods to reduce the thermal profile of the computing system 101. In some examples, the thermal-aware scheduling policy utilizes applications depending on the relevance of the applications to the situation. For example, during takeoff and cruising of an aircraft, applications related to landing would not be executed since those applications are not needed during those phases of flight.

It should be understood that any of the techniques for the thermal-aware scheduling policy described herein can be combined with one or more of the other techniques for the thermal-aware scheduling policy. In some examples, the techniques used for the thermal-aware scheduling policy reduce the thermal profile by limiting the memory transactions, which results in less bandwidth on the memory busses and less power consumption.

The memory throttling techniques limit the number of memory transactions for the computing resources 102 and/or adjust an amount of memory utilization by one or more applications 118 executed by the computing resources 102 to comply with the thermal envelope requirements. In some examples, the memory throttling techniques are implemented using a hardware mechanism (for example, a hardware part that is able to limit or shape the memory traffic on particular memory busses). In some examples, the memory throttling includes setting an upper limit for available memory bandwidth for a particular computing resource 102 such that the number of memory transactions for that computing resource 102 is limited individually. In some examples, the memory throttling includes setting an upper limit for available memory bandwidth for all computing resources 102 such that the total number of memory transactions for all of the computing resource 102 is limited in the aggregate. In such examples, the available memory bandwidth can be utilized on a prioritized basis (for example, more memory bandwidth allocated to safety-critical applications compared to best-effort applications).

In some examples, the memory throttling techniques are implemented using a software mechanism where one or more applications 118 include a workload that implements a policy to guarantee that the workload (or the application that includes the workload) does not cause the computing resources 102 and computing system 101 generally to violate the thermal envelope. Each of these "smart workloads" is aware of the one or more operational parameters and modifies itself based on the one or more operational parameters. In some examples, a smart workload adjusts a number of memory transactions for the workload based on the one or more operational parameters. For example, if the smart workload includes an if statement, the smart workload can be configured to periodically insert empty cycles for the if statement based on the one or more operational parameters in order to reduce the amount of memory transactions over a given period of time to reduce the thermal profile. In some examples, the smart workloads can be aware of hardware limitations of a memory bus, the upper limit information for memory throttling as discussed above, and/or a particular policy for memory traffic shaping on the memory bus. In such examples, the smart workloads can be configured to modify their operation to ensure that the memory utilization for the workload stays below the upper limits of the hardware and/or complies with the memory traffic shaping policy. In some examples, the memory throttling that involves including upper limits for hardware may not be necessary if all of the applications include the smart workload functionality.

It should be understood that any of the techniques for the memory throttling described herein can be combined with one or more of the other techniques for the memory throttling. In some examples, the techniques used for memory throttling reduce the thermal profile by limiting the memory transactions, which results in less bandwidth on the memory busses and less power consumption.

The cache allocation techniques allocate cache 114 to workloads based on the memory demands of the workloads. As discussed above, the amount of cache 114 is fixed. Portions of the cache are allocated to the applications (workloads) for use during operation. In some examples, the workloads with higher memory demands are allocated more cache 114 than workloads with lower memory demands. In some examples, the workloads associated with safety-critical applications, which will likely operate for longer periods of time, are allocated more cache 114 than workloads with lower memory demands. The more cache 114 is allocated to a particular workload, the faster the workload will run since this will limit the number of main memory transactions necessary to execute the workload. In some examples, the techniques used for the cache allocation reduce the thermal profile by limiting the memory transactions, which results in less bandwidth on the memory busses and less power consumption.

In addition to the description above, which focuses on computational processing, the thermal profile can also be reduced for graphical processing by lower the resolution of particular areas on a display, lower the complexity of non-essential components of the rendered scene, lowering the refresh frequency on selected windows on the display, and/or terminating the rendering of non-essential windows on the display. These processes can be implemented using the various techniques described above for the thermal management instructions 108.

It should be understood that any of the thermal-aware scheduling policy, memory throttling, and cache allocation individually, or combinations thereof, can be utilized to guarantee the thermal envelope of the computing system 101.

The thermal management instructions 108 are configured based on the one or more operational parameters. In some examples, the thermal management instructions 108 are selected prior to operation based on known conditions associated with one or more operational parameters and applied statically (as described with respect to FIG. 2). In other examples, at least a portion of the thermal management instructions 108 depend on the one or more operational parameters such that the operation of the computing system 101 changes based on the one or more operational parameters. In some such examples, the thermal management instructions 108 include different profiles for the computing system 101 that are selected depending on the one or more operational parameters (as described with respect to FIG. 3). In other such examples, the thermal management instructions 108 (for example, workload(s) running on one or more computing resources 102) include a feedback loop that can determine and configure computing resources 102 based on the one or more operational parameters (as described with respect to FIG. 4).

In some examples, the operational parameters can be related to the operation of the computing system 101 itself, the environment surrounding the computing system 101, and/or the operation of one or more other systems that contain the computing system 101. Some examples of operational parameters related to the operation of the computing system 101 itself include on-board (for example, processor or memory) temperature of the computing system 101, energy consumption of the computing system 101, on-board battery status or battery health of the computing system 101, and/or power consumption of the computing system 101. Some examples of operational parameters related to the environment surrounding the computing system 101 include ambient air temperature around the computing system 101 and/or air flow around the computing system 101. Some examples of operational parameters related to the operation of one or more other systems that contain the computing system 101 include a stage of flight of an aircraft that includes the computing system 101, altitude of the vehicle that includes the computing system 101, Weight on Wheels logic, velocity, pilot health status, and/or emergency state of a vehicle that includes the computing system 101. It should be understood that the above list of operational parameters is not intended to be exhaustive and that other operational parameters in addition to, or instead of, those described above could be used depending on the particular details of the computing system 101.

In the example shown in FIG. 1, the computing system 101 includes one or more interface devices 120 that are configured to receive one or more operational parameters from at least one external device 122 that is separate from the computing system 101. The external device(s) 122 could be a sensor or other component of the system 100 configured to process sensor data to provide the one or more operational parameters to the computing system 101. In other examples, the computing system 101 can include one or more sensors or process data to generate the one or more operational parameters.

Figure 2:
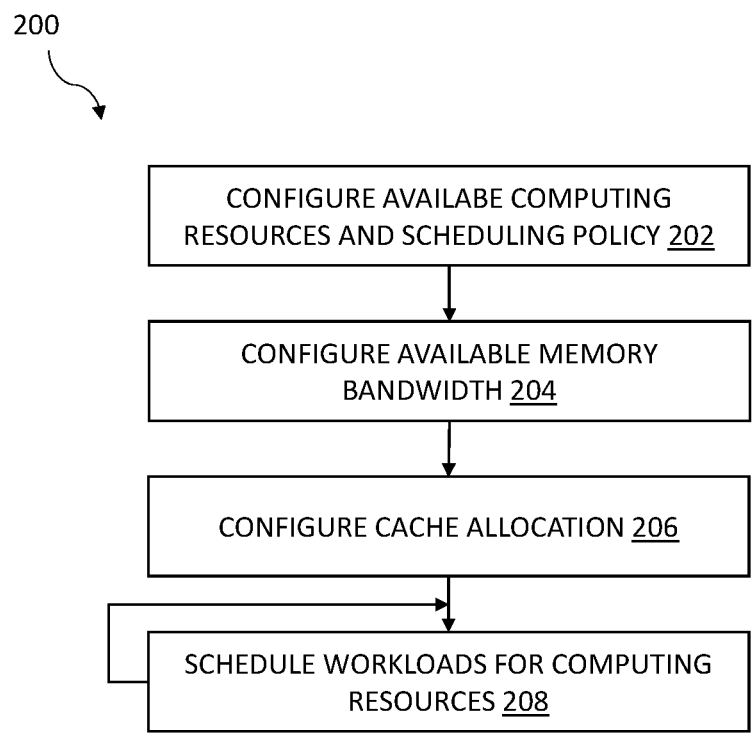
FIG. 2 is a flow diagram of an example method for statically guaranteeing a thermal envelope of a computing system based on one or more operational parameters.

FIG. 2 illustrates a flow diagram of an example method 200 for statically guaranteeing a thermal envelope of a computing system based on one or more operational parameters. The common features discussed above with respect to computing system 101 with respect to FIG. 1 can include similar characteristics to those discussed with respect to method 200 and vice versa. In some examples, the method 200 is performed using one or more components of the computing system 101.

The method 200 includes configuring the available computing resources and the scheduling policy for the computing resources (block 202). In some examples, configuring the available computing resources and the scheduling policy includes selecting a particular number or percentage of computing resources to be utilized in order to guarantee that the thermal envelope of the computing system. In some examples, configuring the available computing resources and the scheduling policy includes selecting timing windows and particular applications that can operate during the timing windows. In general, any of the techniques described above for the thermal-aware scheduling policy can be used at block 202.

The method 200 further includes configuring the available memory bandwidth (block 204). In some examples, configuring the available memory bandwidth includes setting an upper limit for available memory bandwidth for a particular computing resource such that the number of memory transactions for that computing resource is limited individually. In some examples, configuring the available memory bandwidth includes setting an upper limit for available memory bandwidth for all computing resources such that the total number of memory transactions for all of the computing resource is limited in the aggregate. In general, any of the techniques described above for memory throttling can be used at block 204.

The method 200 further includes configuring the cache allocation for the computing resources (block 206). In some examples, the amount of cache for the computing system is fixed, and portions of the cache are allocated to the applications (workloads) for use during operation. In some examples, configuring the cache allocation for computing resources includes allocating cache to workloads based on the memory demands of the workloads. In some examples, the workloads with higher memory demands are allocated more cache than workloads with lower memory demands. In general, any of the techniques described above for cache allocation can be used at block 206.

The method 200 further includes scheduling workloads for the computing resources based on the configuration(s) (block 208). The workloads are scheduled for the computing resources based on the thermal-aware scheduling policy (using only the available computing resources and timing windows), the available memory bandwidth for the computing resources (using the limited amount), and/or the cache allocated to the computing resources. The method 200 repeats block 208 while the computing system is in operation.

While the example method 200 shown in FIG. 2 includes using all of the techniques in blocks 202, 204, 206, it should be understood that one of these blocks, or different combinations of two or more of these blocks, can be used for thermal management of the computing system. Further, while the example method 200 shown in FIG. 2 shows a particular order of operations, it should be understood that the blocks 202, 204, 206 can be executed in a different order or in parallel.

Figure 3:
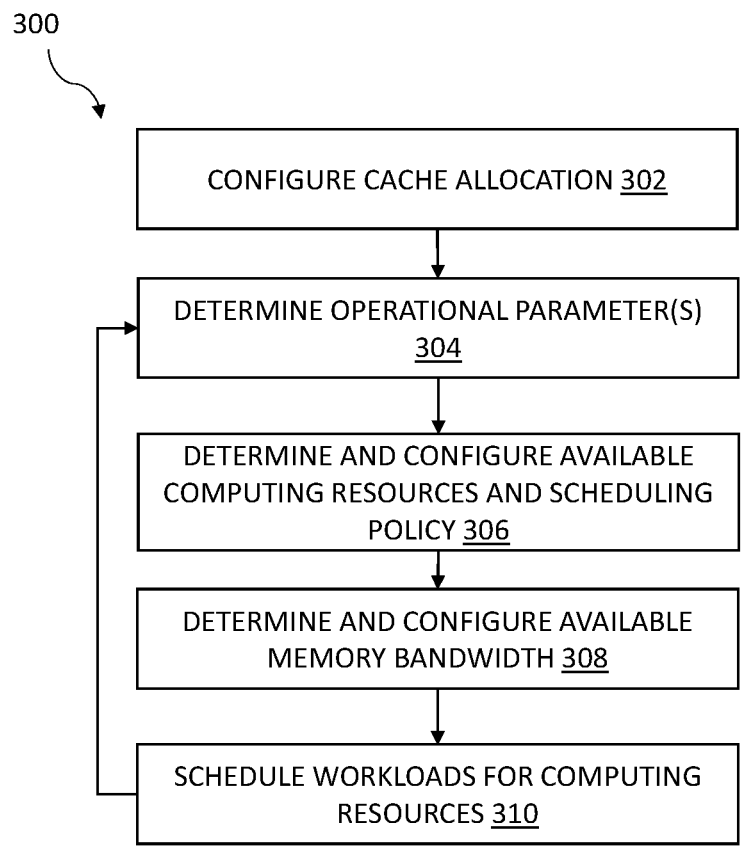
FIG. 3 is a flow diagram of an example method for dynamically guaranteeing a thermal envelope of a computing system based on one or more operational parameters.

FIG. 3 illustrates a flow diagram of an example method 300 for dynamically guaranteeing a thermal envelope of a computing system based on one or more operational parameters. The common features discussed above with respect to computing system 101 with respect to FIG. 1 can include similar characteristics to those discussed with respect to method 300 and vice versa. In some examples, the method 300 is performed using one or more components of the computing system 101.

The method 300 includes configuring the cache allocation for the computing resources (block 302). In some examples, the amount of cache for the computing system is fixed, and portions of the cache are allocated to the applications (workloads) for use during operation. In some examples, configuring the cache allocation for computing resources includes allocating cache to workloads based on the memory demands of the workloads. In some examples, the workloads with higher memory demands are allocated more cache than workloads with lower memory demands. In general, any of the techniques described above for cache allocation can be used at block 302.

The method 300 further includes determining one or more operational parameters (block 304). In some examples, determining one or more operational parameters includes receiving data from one or more external devices (for example, sensors) that are separate from the computing system. In some examples, determining one or more operational parameters includes processing data from the one or more external devices to determine the one or more operational parameters. For example, the computing system can determine velocity of the system that includes the computing system by processing images or location data from different times. In general, any of the operational parameters described above can be determined at block 304.

The method 300 further includes determining and configuring the available computing resources and the scheduling policy for the computing resources (block 306). In some examples, determining and configuring the available computing resources and the scheduling policy includes determining a particular number or percentage of computing resources to be utilized in order to guarantee that the thermal envelope of the computing system based on the one or more operational parameters. In some examples, determining and configuring the available computing resources and the scheduling policy includes reducing the number or percentage of computing resources to be utilized and/or reducing the timing windows available for workloads when the one or more operational parameters indicate that the thermal profile of the computing system is above a threshold. In some examples, determining and configuring the available computing resources and the scheduling policy includes increasing the number or percentage of computing resources to be utilized and/or increasing the timing windows available for workloads when the one or more operational parameters indicate that the thermal profile of the computing system is below a threshold. In general, any of the techniques described above for the thermal-aware scheduling policy can be used at block 306.

The method 300 further includes determining and configuring the available memory bandwidth (block 308). In some examples, determining and configuring the available memory bandwidth includes determining an upper limit for available memory bandwidth for computing resources that can guarantee the thermal envelope of the computing system. In some examples, determining and configuring the available memory bandwidth includes reducing the available memory bandwidth for computing resources when the one or more operational parameters indicate that the thermal profile of the computing system is above a threshold. In some examples, determining and configuring the available memory bandwidth includes increasing the available memory bandwidth for computing resources when the one or more operational parameters indicate that the thermal profile of the computing system is below a threshold. In general, any of the techniques described above for memory throttling can be used at block 308.

The method 300 further includes scheduling workloads for the computing resources based on the configuration(s) (block 310). The workloads are scheduled for the computing resources based on the thermal-aware scheduling policy (using only the available computing resources and timing windows), the available memory bandwidth for the computing resources (using the limited amount), and/or the cache allocated to the computing resources.

Periodically, the method 300 reverts back to block 304 in order to accommodate changes in the operational parameters that can affect the thermal profile of the computing system. In some examples, the method 300 reverts back to block 304 after a specified period of time (for example, five minutes). The blocks 304-310 are repeated while the computing system is in operation.

While the example method 300 shown in FIG. 3 includes using all of the techniques in blocks 302, 306, 308, it should be understood that one of these blocks, or different combinations of two or more of these blocks, can be used for thermal management of the computing system. Further, while the example method 300 shown in FIG. 3 illustrates a particular order of operations, it should be understood that the blocks 306 and 308 can be executed in a different order or in parallel. Furthermore, while the example method 300 shown in FIG. 3 illustrates a static cache allocation, it should be understood that the cache allocation could also be varied based on the one or more operational parameters in a manner similar to the other techniques.

Figure 4:
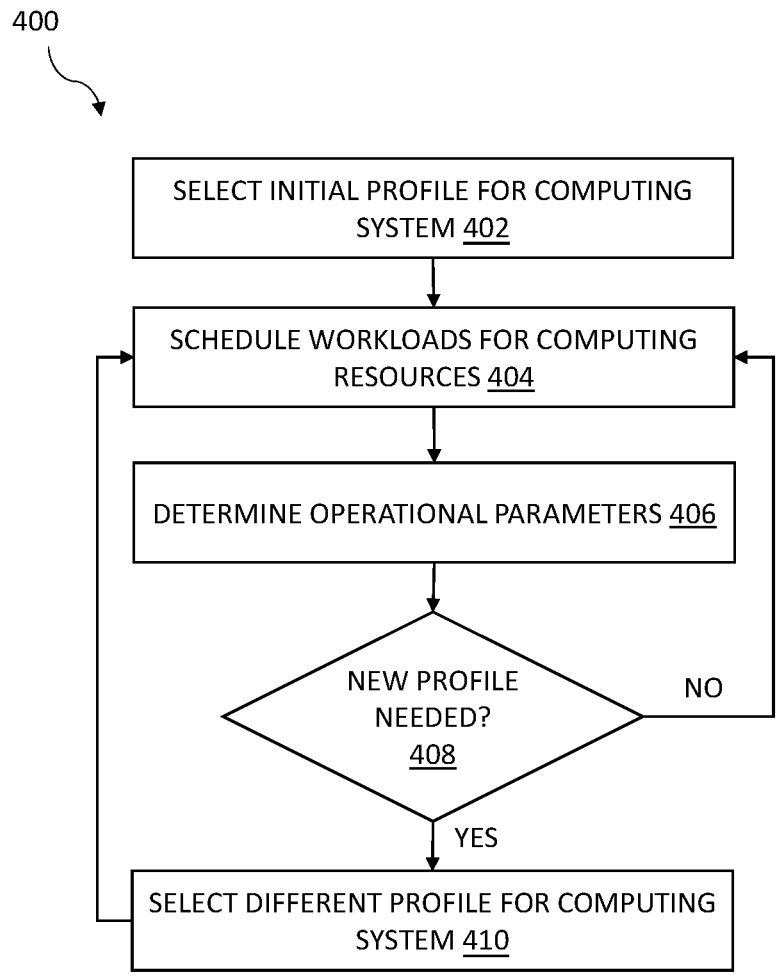
FIG. 4 is a flow diagram of an example hybrid method for a guaranteeing a thermal envelope of a computing system based on one or more operational parameters.

FIG. 4 illustrates a flow diagram of an example method 400 for hybrid approach of guaranteeing a thermal envelope of a computing system based on one or more operational parameters. The common features discussed above with respect to computing system 101 with respect to FIG. 1 can include similar characteristics to those discussed with respect to method 400 and vice versa. In some examples, the method 400 is performed using one or more components of the computing system 101.

The method 400 includes selecting an initial profile for the computing system (block 402). In some examples, a number of profiles (for example, five profiles) are determined prior to operation based on real-world data or simulation data. Each of the profiles includes a particular thermal-aware scheduling policy, memory throttling, and/or cache allocation that are applicable to the conditions experienced for particular operational parameters. In some examples, each of the profiles includes a different level of power reduction for the computing system compared to the other profiles. As an example, one profile applicable during a first stage of flight (for example, takeoff) can include greater reduction of the thermal profile of the computing system compared to the profile applicable during a second stage of flight (for example, cruise) where the operational parameters are more likely to allow greater power consumption and performance by the computing system.

The method 400 further includes scheduling workloads for the computing resources based on the configuration(s) (block 404). The workloads are scheduled for the computing resources based on the thermal-aware scheduling policy (using only the available computing resources and timing windows), the available memory bandwidth for the computing resources (using the limited amount), and/or the cache allocated to the computing resources.

The method 400 further includes determining operational parameters (block 406). In some examples, determining one or more operational parameters includes receiving data from one or more external devices (for example, sensors) that are separate from the computing system. In some examples, determining one or more operational parameters includes processing data from the one or more external devices to determine the one or more operational parameters. For example, the computing system can determine velocity of the system that includes the computing system by processing images or location data from different times. In general, any of the operational parameters described above can be determined at block 406.

The method 400 further includes determining whether a new profile is needed for the computing system (block 408). In some examples, determining whether a new profile is needed for the computing system includes determining whether the one or more operational parameters fall within thresholds associated with a different profile than the profile current used. In some such examples, determining whether a new profile is needed for the computing system includes determining whether the particular phase of flight has changed or whether the thermal profile of the computing system is above or below a threshold.

In response to a determination that a new profile is not needed, the method 400 proceeds back to block 404 to continue scheduling workloads for the computing resources using the current profile for the computing system.

In response to a determination that a new profile is needed, the method 400 proceeds with selecting a different profile for the computing system (block 410). After the new profile is selected, the method 400 proceeds back to block 404 to schedule workloads for the computing resources using the new profile for the computing system and repeats blocks 404-410 during operation of the computing system.

Figure 5:
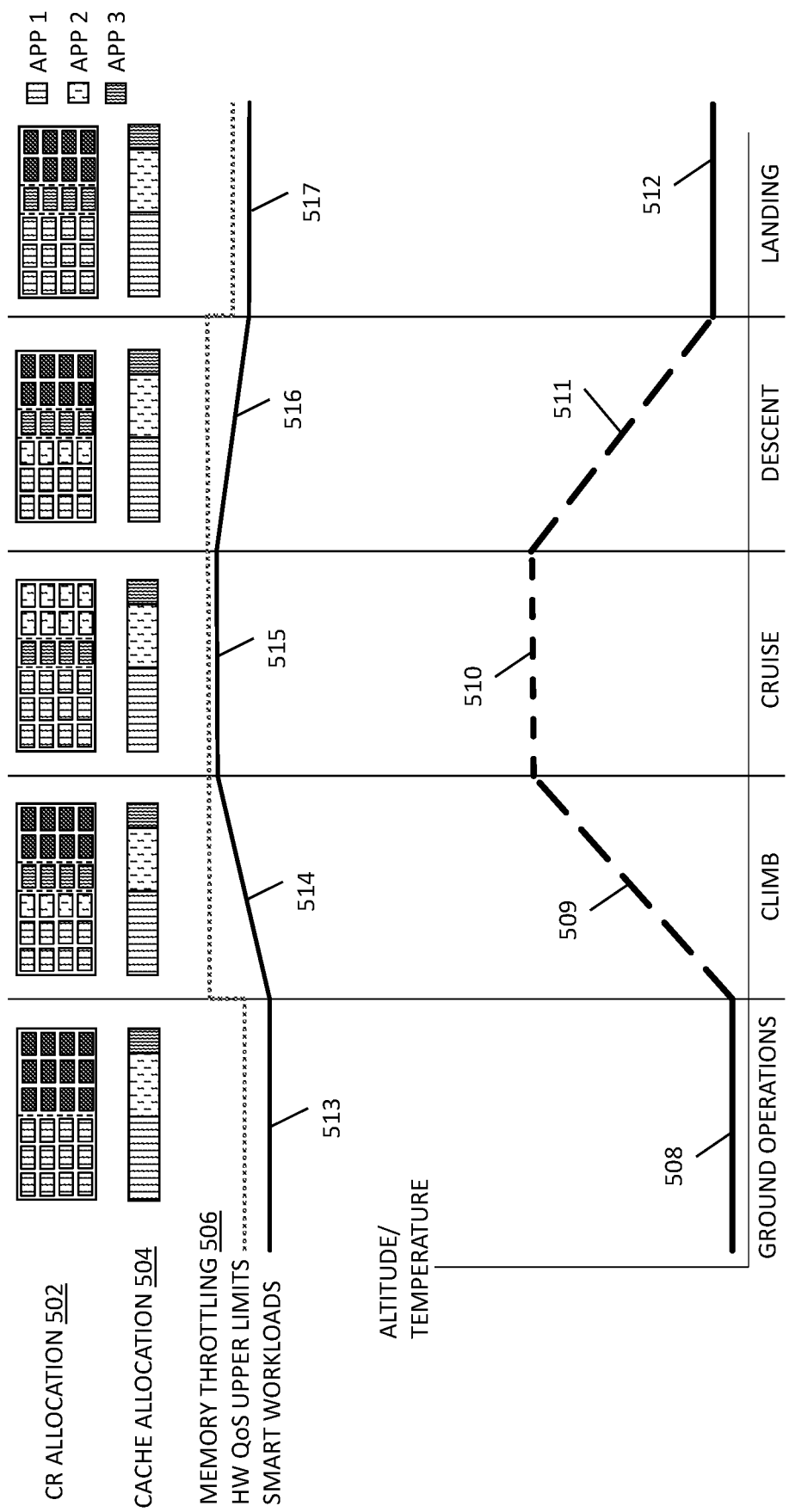
FIG. 5 is a diagram illustrating different example techniques for guaranteeing a thermal envelope of a computing system based on one or more operational parameters during different stages of flight.

FIG. 5 is a diagram illustrating different example techniques for guaranteeing a thermal envelope of a computing system based on one or more operational parameters during different stages of flight. In the example shown in FIG. 5, the thermal management techniques used are similar to those described above with respect to FIG. 3. The primary operational parameters used for adjusting the thermal management techniques in the example shown in FIG. 5 are the stage of flight (ground operations, climb, cruise, descent, and landing) and the ambient temperature (indicated by lines 508-512). In the example shown in FIG. 5, the solid line 508 indicates high temperatures, the longer dashed lines 509, 511 indicate medium-high temperatures, and the shorter dashed line 510 indicates low temperatures.

The cache allocation 504, which is static in the example shown in FIG. 5, includes approximately 60% of the cache allocated for application 1, approximately 30% of the cache allocated for application 2, and approximately 10% of the cache allocated for application 3. This cache allocation 504 would be utilized, for example, where the workloads associated with application 1 are the most memory intensive and/or prioritized and the workloads associated with application 3 are the least memory intensive and/or prioritized. In other examples, the cache allocation 504 could be modified based on the operational parameter(s).

During ground operations, the altitude is the lowest and the ambient temperature surrounding the computing system is highest (indicated by the solid line). As indicated by the computing resources allocation, only half of the computing resources are available for workloads (the solid boxes indicate unavailable computing resources) and all of those computing resources are allocated for application 1 (for example, takeoff applications or safety-critical applications). Also, during ground operations, the upper limits on available memory bandwidth for computing resources (memory throttling) has the lowest limit, which will result in the fewest allowed memory transactions for any stage of flight. The memory utilization of the smart workloads executed by the computing resources of the computing system (memory throttling 506) is at its lowest level as indicated at 513.

As the phase of flight transitions to climbing, the ambient temperature decreases as indicated by the dashed line 509. As indicated by the computing resources allocation 502, additional computing resources are available for workloads (the solid boxes indicate unavailable computing resources) and half of those computing resources are allocated for application 1 (for example, safety-critical applications) while the other half of the available computing resources are divided evenly between application 2 and application 3 (for example, best-effort applications). Also, during climbing, the upper limits on available memory bandwidth for computing resources (memory throttling 506) increases, which will result in more allowed memory transactions during climbing compared to ground operations. The memory utilization of the smart workloads executed by the computing resources of the computing system (memory throttling 506) also increases as indicated at 514.

As the phase of flight transitions to cruise, the ambient temperature decreases to its lowest amount as indicated by the dashed line 510. As indicated by the computing resources allocation 502, all of the computing resources are available for workloads (the solid boxes indicate unavailable computing resources). Half of those computing resources are allocated for application 1 (for example, safety-critical applications), one-third of the available computing resources are allocated to application 2, and one-sixth of the available computing resources are allocated to application 3. Also, during cruise, the upper limits on available memory bandwidth for computing resources (memory throttling 506) remain high, which will result in more allowed memory transactions during cruise compared to ground operations. The memory utilization of the smart workloads executed by the computing resources of the computing system (memory throttling 506) is at its maximum as indicated at 515.

As the phase of flight transitions to descent, the ambient temperature increases as indicated by the dashed line 511. As indicated by the computing resources allocation 502, all of the computing resources are available for workloads (the solid boxes indicate unavailable computing resources). Half of the available computing resources are allocated for application 1 (for example, safety-critical applications) while the other half of the available computing resources are divided evenly between application 2 and application 3 (for example, best-effort applications). Also, during descent, the upper limits on available memory bandwidth for computing resources (memory throttling 506) remain high, which will result in more allowed memory transactions during descent compared to ground operations. The memory utilization of the smart workloads executed by the computing resources of the computing system (memory throttling 506) decreases as indicated at 516.

As the phase of flight transitions to landing, the ambient temperature increases to a higher value as indicated by the solid line 512. As indicated by the computing resources allocation 502, the amount of the computing resources available for workloads remains the same as for descent (the solid boxes indicate unavailable computing resources). However, three-fourths of the available computing resources are allocated for application 1 (for example, landing or safety-critical applications), and one-fourth of the available computing resources are allocated to application 3. No computing resources are allocated to application 2. Also, during landing, the upper limits on available memory bandwidth for computing resources (memory throttling 506) are kept at a lower level, which will result in fewer allowed memory transactions during landing compared to climbing, cruise, and descent. The memory utilization of the smart workloads executed by the computing resources of the computing system (memory throttling 506) is also kept at a lower level as indicated at 517.

Figure 6:
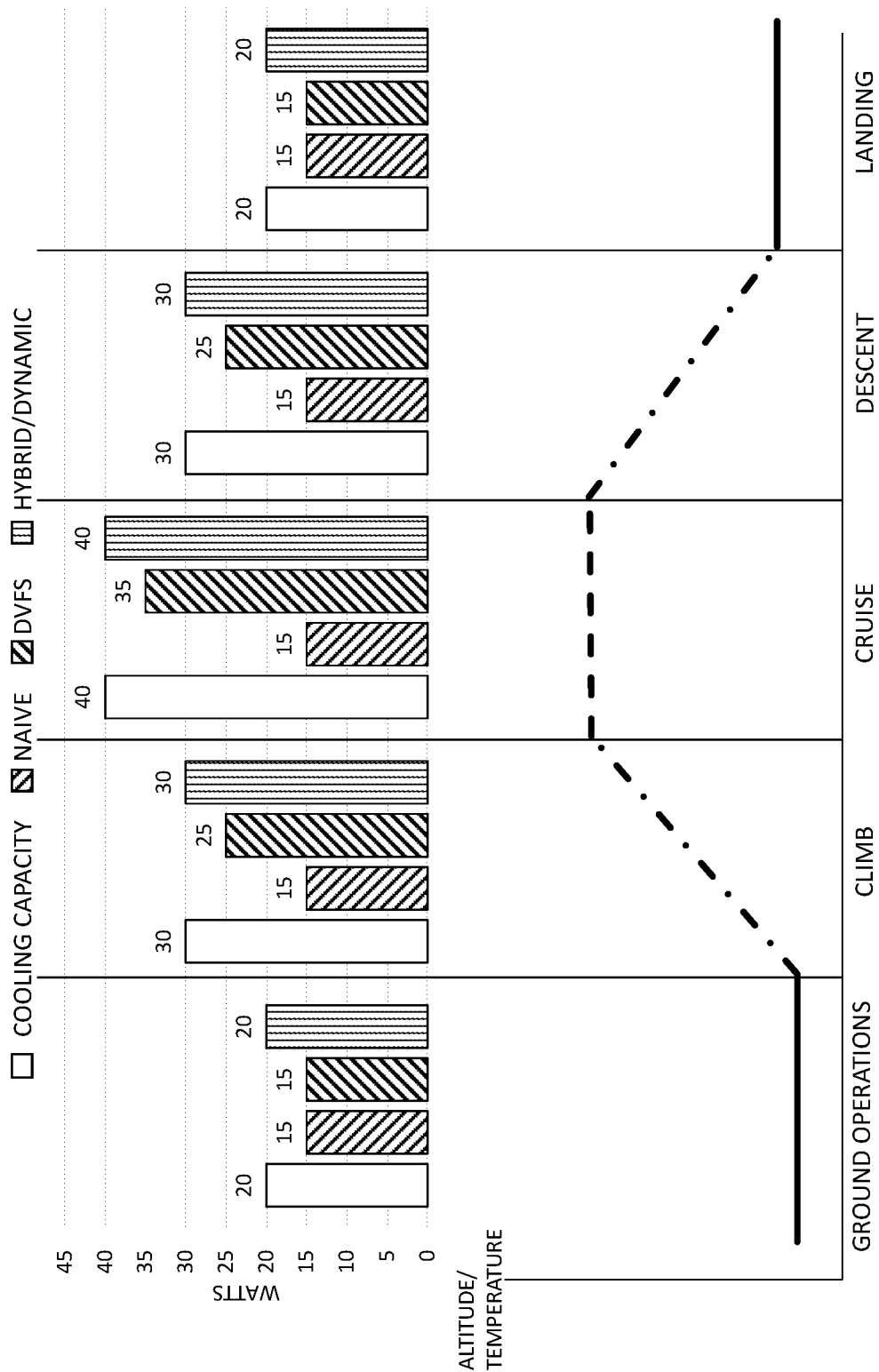
FIG. 6 is a diagram illustrating a comparison of the methods described herein compared to previous techniques during different stages of flight.

FIG. 6 is a diagram illustrating a theoretical comparison of the hybrid and dynamic methods described herein compared to previous techniques during different stages of flight. As shown in FIG. 6, the naïve approach, which includes permanently setting the operational frequency and voltage for computing resources, provides the worst performance for climbing, cruise, and descent since the operation of the components does not change during flight. Also, as shown in FIG. 6, the DVFS technique, which includes dynamically varying the operational frequency and voltage of the computing resources, provides better performance compared to the naïve approach. However, the DVFS technique still does not provide optimal performance due to the limitations described above. The hybrid and dynamic methods described herein enable the maximum available cooling capacity to be utilized by the computing system during all stages of flight by using the thermal-aware scheduling policy, memory throttling, and/or cache allocation techniques described above.

The systems and methods described herein use various thermal management techniques to enable a computing system configured to perform computation and/or graphical processing to operate closer to its maximum performance given the environmental conditions while also providing consistent operation sufficient for safety-critical applications. In particular, the thermal envelope of a computing system is guaranteed by the thermal management techniques, which preserve the computation and graphical processing performance capabilities of the computing system.

In various aspects, system elements, method steps, or examples described throughout this disclosure (such as the computing system, or components thereof, for example) may be implemented on one or more computer systems including a central processing unit (CPU), graphics processing unit (GPU), field programmable gate array (FPGA), application specific integrated circuit (ASIC) and/or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a computing system comprising: computing resources and memory, wherein the computing resources are configured to perform computation and/or graphical processing; wherein the computing system is configured to guarantee a thermal envelope of the computing system based on one or more operational parameters by: implementing a thermal-aware scheduling policy that utilizes an amount of computing resources and timing windows of the computing system based on the one or more operational parameters; adjusting an amount of available memory bandwidth to the computing resources of the computing system based on the one or more operational parameters; adjusting an amount of memory utilization of one or more applications executed by the computing resources of the computing system based on the one or more operational parameters; and/or allocating cache to workloads based on memory demands of the workloads, wherein more cache is allocated to workloads with high memory demands compared to workloads with low memory demands; wherein the computing system is configured to schedule workloads for the computing resources based on the thermal-aware scheduling policy, the available memory bandwidth, the amount of memory utilization, and/or the cache allocation.

Example 2 includes the computing system of Example 1, wherein the one or more operational parameters include: a stage of flight of an aircraft that includes the computing system; ambient air temperature around the computing system; on-board temperature of the computing system; air flow around the computing system; altitude; Weight on Wheels; velocity; energy consumption of the computing system; on-board battery status or battery health of the computing system; pilot health status; emergency state of a vehicle that includes the computing system; and/or power consumption of the computing system.

Example 3 includes the computing system of any of Examples 1-2, wherein the computing system includes: one or more graphics processing units; one or more single/multi-core central processing units; one or more single/multi-core digital signal processors; one or more specialized custom processing units (vision processing unit, application-specific integrated circuit, specialized co-processors); and/or one or more field-programmable gate arrays.

Example 4 includes the computing system of any of Examples 1-3, wherein adjusting an amount of memory bandwidth available to the computing resources of the computing system includes modifying computing periods or shaping memory traffic to introduce upper limits of its thermal envelope.

Example 5 includes the computing system of any of Examples 1-4, wherein the thermal-aware scheduling policy adjusts the amount of computing resources and/or timing windows of the computing system being utilized when the one or more operational parameters indicate that the computing system is operating below a threshold ratio of its thermal envelope.

Example 6 includes the computing system of any of Examples 1-5, wherein the computing system further comprises one or more sensors configured to measure the one or more operational parameters, wherein the computing system is further configured to: dynamically determine a modified thermal-aware scheduling policy and a modified amount of available memory bandwidth based on the measured one or more operational parameters; and schedule workloads for the computing system based on the dynamically determined modified thermal-aware scheduling policy and the dynamically determined modified amount of available memory bandwidth.

Example 7 includes the computing system of any of Examples 1-6, wherein a first application of the one or more applications includes a workload configured to adjust the amount of memory utilization of the first application based on the one or more operational parameters.

Example 8 includes the computing system of any of Examples 1-7, wherein the computing system is configured to execute a first set of applications during a first stage of flight of an aircraft including the computing system, wherein the computing system is configured to execute a second set of applications during a second stage of flight of the aircraft including the computing system, wherein the first set of applications differ from the second set of applications.

Example 9 includes the computing system of Example 8, wherein the first set of applications is associated with safety-critical workloads, wherein the second set of applications is associated with safety-critical workloads and best-effort workloads.

Example 10 includes the computing system of any of Examples 1-9, wherein the computing system is configured to execute a first set of safety-critical applications associated during a first stage of flight of an aircraft including the computing system, wherein the computing system is configured to execute a second set of safety-critical applications during a second stage of flight of the aircraft including the computing system, wherein the first set of safety-critical applications differ from the second set of safety-critical applications.

Example 11 includes the computing system of any of Examples 1-10, wherein the computing system is configured to guarantee a thermal envelope of the computing system based on one or more operational parameters by: implementing a thermal-aware scheduling policy that utilizes an amount of computing resources and timing windows of the computing system based on the one or more operational parameters; adjusting an amount of available memory bandwidth to the computing resources of the computing system based on the one or more operational parameters; adjusting an amount of memory utilization of one or more applications executed by the computing resources of the computing system based on the one or more operational parameters; and allocating cache to workloads based on the memory demands of the workloads, wherein more cache is allocated to workloads with high memory demands compared to workloads with low memory demands; wherein the computing system is configured to schedule workloads for the computing resources based on the thermal-aware scheduling policy, the available memory bandwidth, the amount of memory utilization, and the cache allocation.

Example 12 includes a method, comprising: guaranteeing a thermal envelope of a computing system, including computing resources configured to perform computation and/or graphical processing and memory, based on one or more operational parameters by: implementing a thermal-aware scheduling policy that utilizes an amount of computing resources and timing windows of the computing system based on the one or more operational parameters; adjusting an amount of available memory bandwidth to the computing resources of the computing system based on the one or more operational parameters; adjusting an amount of memory utilization of one or more applications executed by the computing resources of the computing system based on the one or more operational parameters; and/or allocating cache to workloads based on memory demands of the workloads, wherein more cache is allocated to workloads with high memory demands compared to workloads with low memory demands; and scheduling workloads for the computing resources based on the thermal-aware scheduling policy, the available memory bandwidth, the amount of memory utilization, and/or the cache allocation.

Example 13 includes the method of Example 12, wherein the one or more operational parameters include: a stage of flight of an aircraft that includes the computing system; ambient air temperature around the computing system; on-board temperature of the computing system; air flow around the computing system; altitude; Weight on Wheels; velocity; energy consumption of the computing system; on-board battery status or battery health of the computing system; pilot health status; emergency state of a vehicle that includes the computing system; and/or power consumption of the computing system.

Example 14 includes the method of any of Examples 12-13, wherein the computing system includes: one or more graphics processing units; one or more single/multi-core central processing units; one or more single/multi-core digital signal processors; one or more specialized custom processing units (vision processing unit, application-specific integrated circuit, specialized co-processors); and/or one or more field-programmable gate arrays.

Example 15 includes the method of any of Examples 12-14, wherein adjusting an amount of memory bandwidth available to the computing resources of the computing system includes modifying computing periods or shaping memory traffic to introduce upper limits of its thermal envelope.

Example 16 includes the method of any of Examples 12-15, wherein the thermal-aware scheduling policy adjusts the amount of computing resources and/or timing windows of the computing system being utilized when the one or more operational parameters indicate that the computing system is operating below a threshold ratio of its thermal envelope.

Example 17 includes the method of any of Examples 12-16, further comprising: receiving or determining the one or more operational parameters; dynamically determining a modified thermal-aware scheduling policy and a modified amount of available memory bandwidth based on the received or determined one or more operational parameters; and scheduling workloads for the computing system based on the dynamically determined modified thermal-aware scheduling policy and the dynamically determined modified amount of available memory bandwidth.

Example 18 includes the method of any of Examples 12-17, further comprising: executing a first set of applications during a first stage of flight of an aircraft including the computing system; executing a second set of applications during a second stage of flight of the aircraft including the computing system, wherein the first set of applications differ from the second set of applications, wherein the first set of applications is associated with safety-critical workloads, wherein the second set of applications is associated with safety-critical workloads and best-effort workloads.

Example 19 includes the method of any of Examples 12-18, further comprising: executing a first set of safety-critical applications associated during a first stage of flight of an aircraft including the computing system; executing a second set of safety-critical applications during a second stage of flight of the aircraft including the computing system, wherein the first set of safety-critical applications differ from the second set of safety-critical applications.

Example 20 includes the method of any of Examples 12-19, the method comprising guaranteeing a thermal envelope of the computing system based on one or more operational parameters by: implementing a thermal-aware scheduling policy that utilizes an amount of computing resources and timing windows of the computing system based on the one or more operational parameters; adjusting an amount of available memory bandwidth to the computing resources of the computing system based on the one or more operational parameters; adjusting an amount of memory utilization of one or more applications executed by the computing resources of the computing system based on the one or more operational parameters; and allocating cache to workloads based on the memory demands of the workloads, wherein more cache is allocated to workloads with high memory demands compared to workloads with low memory demands; and scheduling workloads for the computing resources based on the thermal-aware scheduling policy, the available memory bandwidth, the amount of memory utilization, and the cache allocation.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computing system for dynamically guaranteeing a thermal-aware scheduling policy, the computer system comprising:
computing resources and memory, wherein the computing resources are configured to perform computation and/or graphical processing;
wherein the computing system includes an aircraft and guarantees a thermal envelope of the computing system based on one or more operational parameters by:
implementing the thermal-aware scheduling policy that utilizes an amount of computing resources and timing windows of the computing system based on the one or more operational parameters;
adjusting an amount of available memory bandwidth to the computing resources of the computing system based on the one or more operational parameters, wherein the available memory bandwidth includes determining an upper limit of the available memory bandwidth;
adjusting an amount of memory utilization of one or more applications executed by the computing resources of the computing system based on the one or more operational parameters; and/or
allocating cache to workloads based on memory demands of the workloads, wherein more cache is allocated to workloads with high memory demands compared to workloads with low memory demands;

wherein the computing system is configured to schedule workloads for the computing resources based on the thermal-aware scheduling policy, the available memory bandwidth, the amount of memory utilization, and/or the cache allocation.

2. The computing system of claim 1, wherein the one or more operational parameters include:
- stage of flight of the aircraft that includes the computing system;
- ambient air temperature around the computing system;
- on-board temperature of the computing system;
- air flow around the computing system;
- altitude;
- Weight on Wheels;
- velocity;
- energy consumption of the computing system;
- on-board battery status or battery health of the computing system;
- pilot health status; emergency state of a vehicle that includes the computing system; and/or
- consumption of the computing system.

3. The computing system of claim 1, wherein the computing system includes:
- or more graphics processing units;
- one or more single/multi-core central processing units;
- one or more single/multi-core digital signal processors;
- one or more specialized custom processing units (vision processing unit, application-specific integrated circuit, specialized co-processors); and/or
- one or more field-programmable gate arrays.

4. The computing system of claim 1, wherein adjusting an amount of memory bandwidth available to the computing resources of the computing system includes modifying computing periods or shaping memory traffic to introduce upper limits of its thermal envelope.

5. The computing system of claim 1, wherein the thermal-aware scheduling policy adjusts the amount of computing resources and/or timing windows of the computing system being utilized when the one or more operational parameters indicate that the computing system is operating below a threshold ratio of its thermal envelope.

6. The computing system of claim 1, wherein the computing system further comprises one or more sensors configured to measure the one or more operational parameters, wherein the computing system is further configured to:
- dynamically determine a modified thermal-aware scheduling policy and a modified amount of available memory bandwidth based on the measured one or more operational parameters; and
- schedule workloads for the computing system based on the dynamically determined modified thermal-aware scheduling policy and the dynamically determined modified amount of available memory bandwidth.

7. The computing system of claim 1, wherein a first application of the one or more applications includes a workload configured to adjust the amount of memory utilization of the first application based on the one or more operational parameters.

8. The computing system of claim 1, wherein the computing system is configured to execute a first set of applications during a first stage of flight of an aircraft including the computing system, wherein the computing system is configured to execute a second set of applications during a second stage of flight of the aircraft including the computing system, and wherein the first set of applications differ from the second set of applications.

9. The computing system of claim 8, wherein the first set of applications is associated with safety-critical workloads, wherein the second set of applications is associated with safety-critical workloads and best-effort workloads.

10. The computing system of claim 1, wherein the computing system is configured to execute a first set of safety-critical applications associated during a first stage of flight of the aircraft including the computing system, wherein the computing system is configured to execute a second set of safety-critical applications during a second stage of flight of the aircraft including the computing system, and wherein the first set of safety-critical applications differ from the second set of safety-critical applications.

11. The computing system of claim 1, wherein the computing system is configured to guarantee a thermal envelope of the computing system based on one or more operational parameters by:
- implementing a thermal-aware scheduling policy that utilizes an amount of computing resources and timing windows of the computing system based on the one or more operational parameters;
- adjusting an amount of available memory bandwidth to the computing resources of the computing system based on the one or more operational parameters;
- adjusting an amount of memory utilization of one or more applications executed by the computing resources of the computing system based on the one or more operational parameters; and
- allocating cache to workloads based on the memory demands of the workloads, wherein more cache is allocated to workloads with high memory demands compared to workloads with low memory demands; and wherein the computing system is configured to schedule workloads for the computing resources based on the thermal-aware scheduling policy, the available memory bandwidth, the amount of memory utilization, and the cache allocation.

12. A method for dynamically guaranteeing a thermal-aware scheduling policy, the method comprising:
- guaranteeing a thermal envelope of a computing system that includes an aircraft, including computing resources configured to perform computation and/or graphical processing and memory, based on one or more operational parameters by:
  - implementing the thermal-aware scheduling policy that utilizes an amount of computing resources and timing windows of the computing system based on the one or more operational parameters;
  - adjusting an amount of available memory bandwidth to the computing resources of the computing system based on the one or more operational parameters, wherein the available memory bandwidth includes determining an upper limit of the available memory bandwidth;
  - adjusting an amount of memory utilization of one or more applications executed by the computing resources of the computing system based on the one or more operational parameters; and/or
  - allocating cache to workloads based on memory demands of the workloads, wherein more cache is allocated to workloads with high memory demands compared to workloads with low memory demands; and
  - scheduling workloads for the computing resources based on the thermal-aware scheduling policy, the available memory bandwidth, the amount of memory utilization, and/or the cache allocation.

13. The method of claim 12, wherein the one or more operational parameters include:
   a stage of flight of an aircraft that includes the computing system;
   ambient air temperature around the computing system;
   on-board temperature of the computing system;
   air flow around the computing system;
   altitude;
   Weight on Wheels;
   energy consumption of the computing system;
   on-board battery status or battery health of the computing system;
   pilot health status;
   state of a vehicle that includes the computing system; and/or
   power consumption of the computing system.

14. The method of claim 12, wherein the computing system includes:
   one or more graphics processing units;
   one or more single/multi-core central processing units;
   one or more single/multi-core digital signal processors;
   one or more specialized custom processing units (vision processing unit, application-specific integrated circuit, specialized co-processors); and/or
   one or more field-programmable gate arrays.

15. The method of claim 12, wherein adjusting an amount of memory bandwidth available to the computing resources of the computing system includes modifying computing periods or shaping memory traffic to introduce upper limits of its thermal envelope.

16. The method of claim 12, wherein the thermal-aware scheduling policy adjusts the amount of computing resources and/or timing windows of the computing system being utilized when the one or more operational parameters indicate that the computing system is operating below a threshold ratio of its thermal envelope.

17. The method of claim 12, further comprising:
   receiving or determining the one or more operational parameters;
   determining a modified thermal-aware scheduling policy and a modified amount of available memory bandwidth based on the received or determined one or more operational parameters; and
   scheduling workloads for the computing system based on the dynamically determined modified thermal-aware scheduling policy and the dynamically determined modified amount of available memory bandwidth.

18. The method of claim 12, further comprising:
   executing a first set of applications during a first stage of flight of an aircraft including the computing system; and
   executing a second set of applications during a second stage of flight of the aircraft including the computing system, wherein the first set of applications differ from the second set of applications, wherein the first set of applications is associated with safety-critical workloads, and wherein the second set of applications is associated with safety-critical workloads and best-effort workloads.

19. The method of claim 12, further comprising:
   executing a first set of safety-critical applications associated during a first stage of flight of the aircraft including the computing system; and
   executing a second set of safety-critical applications during a second stage of flight of the aircraft including the computing system, wherein the first set of safety-critical applications differ from the second set of safety-critical applications.

20. The method of claim 12, the method comprising guaranteeing a thermal envelope of the computing system based on one or more operational parameters by
   implementing a thermal-aware scheduling policy that utilizes an amount of computing resources and timing windows of the computing system based on the one or more operational parameters;
   adjusting an amount of available memory bandwidth to the computing resources of the computing system based on the one or more operational parameters;
   adjusting an amount of memory utilization of one or more applications executed by the computing resources of the computing system based on the one or more operational parameters;
   allocating cache to workloads based on the memory demands of the workloads, wherein more cache is allocated to workloads with high memory demands compared to workloads with low memory demands; and
   scheduling workloads for the computing resources based on the thermal-aware scheduling policy, the available memory bandwidth, the amount of memory utilization, and the cache allocation.

* * * * *

UNITED STATES PATENT AND TRADEMARK OFFICE
CERTIFICATE OF CORRECTION

| | | |
|---|---|---|
| PATENT NO. | : 12,204,952 B2 | Page 1 of 1 |
| APPLICATION NO. | : 17/703721 | |
| DATED | : January 21, 2025 | |
| INVENTOR(S) | : Zaykov et al. | |

It is certified that error appears in the above-identified patent and that said Letters Patent is hereby corrected as shown below:

In the Claims

Column 18, Line 63, Claim 1, please replace "and/or" with --and-- between "parameters;" and "allocating".

Column 20, Line 58, Claim 12, please replace "and/or" with --and-- between "parameters;" and "allocating".

Column 20, Line 67, Claim 12, please replace "and/or" with --and-- between "utilization;" and "the cache".

Signed and Sealed this
First Day of April, 2025

Coke Morgan Stewart
*Acting Director of the United States Patent and Trademark Office*